United States Patent
Schmucker et al.

[11] Patent Number: 6,008,894
[45] Date of Patent: Dec. 28, 1999

[54] REMOTE ADJUSTABLE FOCUS RAMAN SPECTROSCOPY PROBE

[75] Inventors: John E. Schmucker, Hurt, Va.; Raymond J. Blasi, Harrison City; William B. Archer, Bethel Park, both of Pa.

[73] Assignee: The United States of America as represented by the United States Department of Energy, Washington, D.C.

[21] Appl. No.: 09/122,854

[22] Filed: Jul. 28, 1998

[51] Int. Cl.⁶ .................................................. G01J 3/44
[52] U.S. Cl. ...................... 356/301; 356/300; 356/317; 356/318
[58] Field of Search ................................. 356/301, 300, 356/317, 318

[56] References Cited

U.S. PATENT DOCUMENTS

| | | | |
|---|---|---|---|
| 3,906,241 | 9/1975 | Thompson | 250/574 |
| 4,008,961 | 2/1977 | Barrett | 356/75 |
| 4,496,839 | 1/1985 | Bernstein | 250/341 |
| 4,802,761 | 2/1989 | Bowen | 356/301 |
| 5,112,127 | 5/1992 | Carrabba | 356/301 |
| 5,194,913 | 3/1993 | Myrick | 356/301 |
| 5,255,067 | 10/1993 | Carrabba | 356/301 |
| 5,262,644 | 11/1993 | Maguire | 250/339 |
| 5,510,894 | 4/1996 | Batchelder | 356/301 |
| 5,818,579 | 10/1998 | Beck et al. | 356/301 |
| 5,841,139 | 11/1998 | Sostek et al. | 356/301 |

*Primary Examiner*—Frank G. Font
*Assistant Examiner*—Reginald A. Ratliff
*Attorney, Agent, or Firm*—Virginia B. Caress; William R. Moser; Paul A. Gottilieb

[57] ABSTRACT

A remote adjustable focus Raman spectroscopy probe allows for analyzing Raman scattered light from a point of interest external probe. An environmental barrier including at least one window separates the probe from the point of interest. An optical tube is disposed adjacent to the environmental barrier and includes a long working length compound lens objective next to the window. A beam splitter and a mirror are at the other end. A mechanical means is used to translated the prove body in the X, Y, and Z directions resulting in a variable focus optical apparatus. Laser light is reflected by the beam splitter and directed toward the compound lens objective, then through the window and focused on the point of interest. Raman scattered light is then collected by the compound lens objective and directed through the beam splitter to a mirror. A device for analyzing the light, such as a monochromoter, is coupled to the mirror.

19 Claims, 1 Drawing Sheet

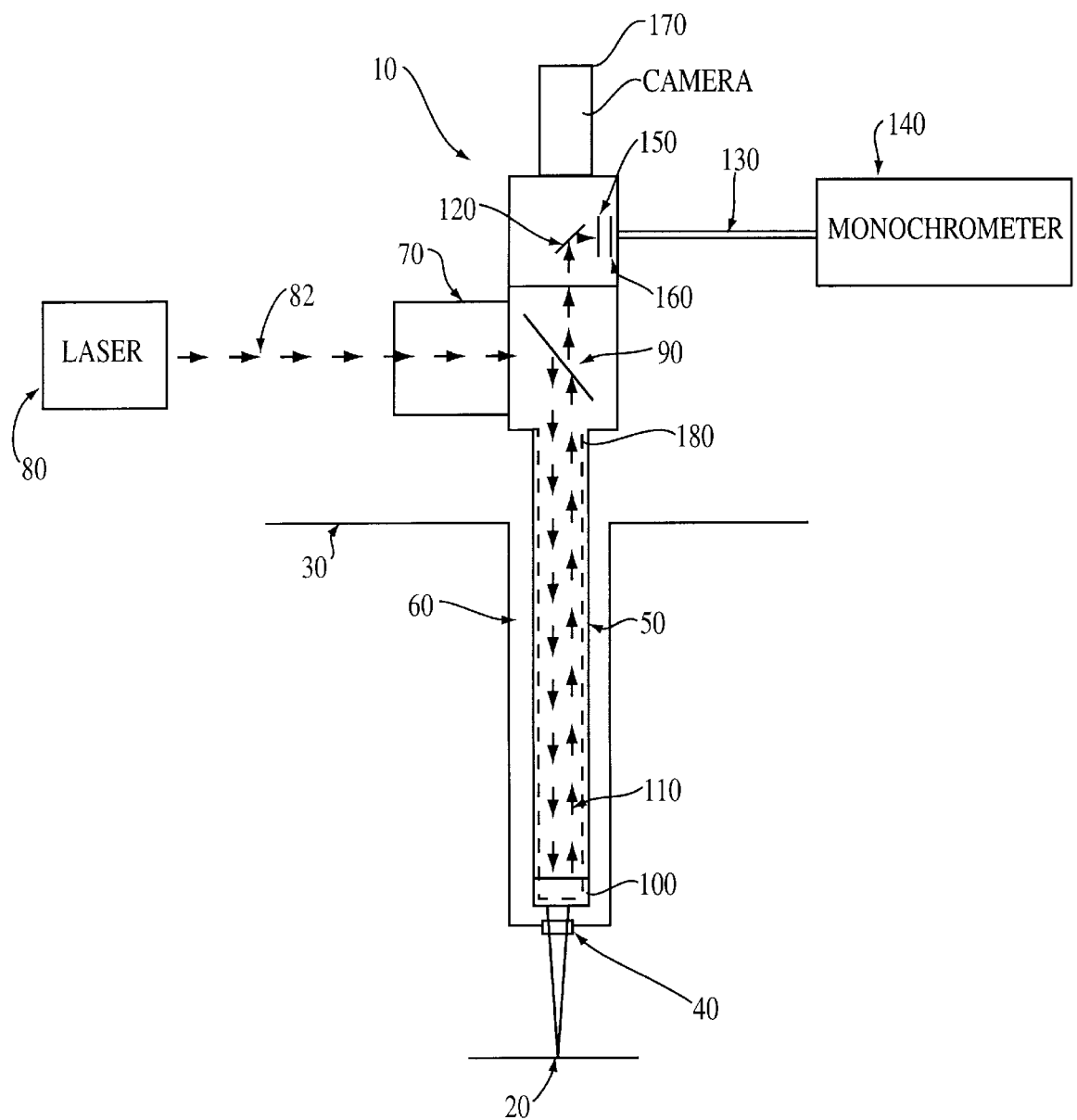

REMOTE ADJUSTABLE FOCUS RAMAN SPECTROSCOPY PROBE

BACKGROUND OF THE INVENTION

1. Field of the Invention

The present invention relates to Raman spectroscopy probes and, more particularly, to a probe which can withstand elevated temperatures.

2. Related Art

In many applications, laser beams are used to excite materials so that the Raman spectra can be analyzed. A measurement device including an axial pass-through Raman cell is disclosed in U.S. Pat. No. 5,194,913, to Myrick et al., the disclosure of which is hereby incorporated by reference. The measurement device uses an optical fiber for delivering the laser light to the sample, which requires the use of a bandpass filter. The sending and receiving optical fibers must be aligned on opposite sides of the sample with a predetermined distance between them. As a consequence, this device can only be used in one location.

Present Raman spectroscopy systems suffer from a number of shortcomings. For example, some operate best on liquids and gases, but not solids. Others are fixed and cannot be used in more than one location. In addition, prior art Raman spectroscopy probes cannot withstand hostile environments such as elevated temperatures, i.e., temperatures as high as 550° F. and elevated pressures, i.e., pressures as high as 2500 psig. Therefore, there exists a need in the art for a Raman spectroscopy probe which can be used in more than one location, can effectively operate on liquids, gases and solids, and can withstand hostile environments such as high temperatures and high pressures.

SUMMARY OF THE INVENTION

In accordance with the invention, a Raman spectroscopy apparatus is provided which, among other advantages, is portable, can be used with liquids, gases and solids and can withstand temperatures up to 550° F. and pressures up to 2500 psig and thus overcomes the above-mentioned deficiencies in the prior art.

The spectroscopy apparatus of the invention enables analyzing Raman scattered light from a point of interest external to the apparatus, e.g., a point of interest in a high pressure and high temperature environment. The apparatus includes:

an environmental barrier including at least one window, preferably formed of diamond;

an optical tube disposed adjacent to the environmental barrier and including a distal end and a proximal end, the optical tube including a long working length compound lens objective, preferably a high temperature resistant objective, at the distal end thereof and a beam splitter and a beam steering mirror at the proximal end thereof, means for coupling a laser light beam to the proximal end of the optical tube such that the beam is reflected by the beam splitter and directed toward the compound lens objective and through the at least one window for focusing on the point of interest such that Raman scattered light from the point of interest is collected by the compound lens objective and directed through the beam splitter to the beam steering mirror; and analyzing means coupled to the beam steering mirror enabling analyzing of the light.

Advantageously, the apparatus further includes a cooling means for cooling the optical tube and the compound lens objective.

In a preferred embodiment, a supernotch filter and a focusing lens are placed between the beam steering mirror and the analyzing means.

Other features and advantages of the present invention are set forth in or apparent from the following detailed description of a preferred embodiment.

BRIEF DESCRIPTION OF THE DRAWINGS

The single FIGURE in the drawings is a schematic top plan view of the adjustable-focus Raman spectroscopy apparatus in accordance with a preferred embodiment of the invention.

DESCRIPTION OF THE PREFERRED EMBODIMENTS

Referring to the drawing, a remote adjustable-focus Raman spectroscopy apparatus is shown which includes a Raman probe 10, which is separated from a point of interest 20 by an environmental barrier 30. The environmental barrier 30, for example, may be a pressure vessel wall, the wall of a flue stack or the wall of an exhaust system. The environmental barrier 30 includes one or more windows 40. Diamond windows are preferred as optical quality pressure boundaries, depending on the application. Because the probe 10 is external to the barrier or boundary 30, a single probe can be used to provide information at as many discrete locations as there are windows 40. Although the windows can be positioned directly in the wall of the barrier 30, in the illustrated embodiment, the window 40 is disposed at the distal end of a dry well 60.

Raman probe 10 includes coupling optics chamber 70 and optical tube 50. Coupling optics chamber 70 is located at the proximal end of probe 10, i.e., at the end of the optical tube farthest from the point of interest 20. A laser 80 produces direct laser light 82 which enters the optics chamber 70 at an angle approximately perpendicular to the longitudinal axis of optical tube 50. The use of direct laser light eliminates the need for a bandpass filter when obtaining Raman spectrum in the 50–3000 $cm^{-1}$ energy region using a 514.5 nm laser excitation light. The laser 80 is preferably a 5.0 Watt, multiline argon ion laser, which has a maximum output of 2.1 Watts of 514.5 nm green laser light. Within the optics chamber, 50% of the laser light is reflected off a holographic beam splitter 90 and down the optical tube 50. The optical tube 50 can be custom built to any length up to 15 inches. At the distal end of the optical tube 50, i.e., the end of the tube closest to the point of interest 20, is located a long working length, compound lens objective 100.

The compound lens objective 100 is preferably a high temperature resistant objective, which means that the objective 100 must be capable of withstanding temperatures up to 450° F. without thermal degradation of the lenses forming the objective 100 or the adhesive used in the manufacturing thereof. Such objectives are conventional; however, the objective must be cooled since the probe reaches temperatures of up to 550° F. and the objective can only withstand temperatures of up to 450° F. Compound lens objective 100 focuses the laser beam 82 through window 40 onto the point of interest 20. The laser light is then Raman scattered by the solid, liquid or gas at the point 20 being observed. The Raman scattered light, which is denoted 110, is then collected by the compound lens objective 100 and directed back up the tube to the beam splitter 90.

50% of the Raman scattered light passes through the beam splitter 90 to a beam steering mirror 120. The steering mirror 120 directs the light to fiber optic cable 130 for transmission to a monochrometer 140. The fiber optic cable 130 allows the monochrometer 140 to be placed in an area or facility which is temperature and humidity controlled at distances up to 100 feet away from the probe. The monochrometer 140 is preferably a short focal length, field hardened, single diffraction type designed specifically for fiber optic input. The monochrometer 140 may be supplied with a low background CCD image detector (not shown). Such monochrometer-detector arrangements are conventional. In a preferred embodiment, a supernotch filter 150 is disposed after the steering mirror 120 to reject Rayleigh scattered light while passing Raman scattered light. A focussing lens 160 is preferably disposed between the supernotch filter 150 and the fiber optic cable 130.

The Raman spectroscopy probe 10 is designed to work at high temperatures. The optics coupling chamber 70 houses temperature sensitive optical components and is kept at room temperature due to its location away from the point of interest 20. Accordingly, only the compound lens objective 100 and the optical tube 50 are subject to high temperatures in the dry well 60. In the preferred embodiment, the optical tube 50 includes a cooling means 180, indicated schematically in the drawing. The cooling means 180 is attached along the inside of the optical tube 50. A preferred cooling means is a tube in a tube-in-tube arrangement (not shown) with the coolant supply delivered in the annulus between the inner and middle tube and the coolant return delivered in the annulus between the middle and outer tube such that the optic tube expansion with temperature is symmetric, i.e., the tube does not deflect with temperature variances. The water cooling method preferably maintains the lens objective 100 at a temperature below 300° F. when the dry well is at a temperature of 550° F. However, the cooling means can take other forms, such as a conventional cold finger water cooling method.

The Raman spectroscopy probe 10 is adjustably focussed in two ways. The probe 10 has internal adjusting features (not shown) that allow focus adjustment. The probe 10 can also be mounted to a positioning stage (not shown) that, depending on the stage selected, can produce external adjustments in the range of nanometers. This positioning stage may also be a micrometer based X-Y-Z translation stage.

The combination of the adjustable focus of probe 10 and window 40 permits the incoming laser light beam 82 to be focused on a discrete point, such as point 20, in front of the window 40. A television camera 170 is located next to optics chamber 70, directly opposite to optical tube 50, for enhancing the focussing of the laser light to the appropriate location by using the camera 170 to view light projected on the location of interest.

Although the invention has been described in detail with respect to preferred embodiments thereof, it will be apparent to those skilled in the art that variations and modifications can be effected in these embodiments without departing from the spirit and scope of the invention.

We claim:

1. A Raman spectroscopy apparatus for analyzing Raman scattered light from a point of interest external to the apparatus, said apparatus comprising:

an environmental barrier including at least one window;

an optical tube disposed adjacent to said environmental barrier and including a distal end and a proximal end, said optical tube including a long working length compound lens objective at said distal end and a beam splitter and a beam steering mirror at said proximal end;

means for coupling a laser light beam to the proximal end of said optical tube such that said beam is reflected by said beam splitter and directed toward said compound lens objective and through said at least one window for focusing said point of interest and Raman scattered light from said point of interest is collected by said compound lens objective and directed through said beam splitter to said beam steering mirror; and an analyzing means coupled to said beam steering mirror enabling analyzing of said light.

2. The apparatus according to claim 1, wherein said point of interest is in a high pressure and high temperature environment.

3. The apparatus according to claim 2, wherein said environment is at a pressure of up to 2500 psig and a temperature of up to 550° F.

4. The apparatus according to claim 3, wherein said at least one window is formed of diamond and said long working length compound lens objective comprises a high temperature resistant objective.

5. The apparatus according to claim 3, wherein said optical tube includes a cooling means for cooling said optical tube and said compound lens objective.

6. The apparatus according to claim 4, wherein said environmental barrier includes a pressure vessel dry well, having a distal end, said window being disposed in said dry well and at least a distal portion of said optical tube extending into said dry well.

7. The apparatus according to claim 4, wherein said optical tube includes a cooling means for cooling said optical tube and said compound lens objective.

8. A Raman spectroscopy apparatus for analyzing Raman scattered light from a point of interest external to the apparatus, said apparatus comprising:

an environmental barrier including at least one window;

an optical tube disposed adjacent to said environmental barrier and including a distal end and a proximal end, said optical tube including a long working length compound lens objective at said distal end and a beam splitter, a beam steering mirror, a supernotch filter and a focusing lens at said proximal end;

means for coupling a laser light beam to the proximal end of said optical tube such that said beam is reflected by said beam splitter and directed toward said compound lens objective and through said at least one window for focusing said point of interest, and Raman scattered light from said point of interest is collected by said compound lens objective and directed through said beam splitter to said beam steering mirror and through said supernotch filter and said focusing lens; and means coupled to said mirror enabling analyzing of said light.

9. The apparatus according to claim 8, wherein said point of interest is in a high pressure and high temperature environment.

10. The apparatus according to claim 9, wherein said environment is at a pressure of up to 2500 psig and a temperature of up to 550° F.

11. The apparatus according to claim 10, wherein said at least one window is formed of diamond and said long working length compound lens objective comprises a high temperature resistant objective.

12. The apparatus according to claim 10, wherein said optical tube includes a cooling means for cooling said optical tube and said compound lens objective.

13. The apparatus according to claim 11, wherein said optical tube includes a cooling means for cooling said optical tube and said compound lens objective.

14. The apparatus according to claim 11, wherein said environmental barrier includes a pressure vessel dry well, having a distal end, said window being disposed in said dry well and at least a distal portion of said optical tube extending into said dry well.

15. A Raman spectroscopy apparatus for analyzing Raman scattered light from a point of interest external to the apparatus, said apparatus comprising:

an environmental barrier including at least one window;

a variable focus optical means for focusing a laser light beam through said window on said point of interest and collecting Raman scattered light from said point of interest; and an analyzing means coupled to said variable focus means for enabling analyzing of said light.

16. The apparatus according to claim 15, wherein said point of interest is in a high pressure and high temperature environment.

17. The apparatus according to claim 16, wherein said variable focus means includes an optical tube having a long working length compound lens objective and a cooling means for cooling said objective.

18. The apparatus according to claim 17, wherein said at least one window is formed of diamond and said long working length compound lens objective is a high temperature type.

19. The apparatus according to claim 18, wherein said environmental barrier includes a pressure vessel dry well, having a distal end, said window being disposed in said dry well and at least a distal portion of said optical tube extending into said dry well.

* * * * *